United States Patent [19]
Taniguchi et al.

[11] Patent Number: 4,851,657
[45] Date of Patent: Jul. 25, 1989

[54] FOCUS CONDITION DETECTING DEVICE USING WEIGHTED CENTER OR CONTRAST EVALUATION

[75] Inventors: Nobuyuki Taniguchi, Nishinomiya; Tokuji Ishida, Daito; Masataka Hamada, Osaka; Toshihiko Karasaki; Toshio Norita, both of Sakai, all of Japan

[73] Assignee: Minolta Camera Kabushiki Kaisha, Osaka, Japan

[21] Appl. No.: 251,938

[22] Filed: Sep. 28, 1988

Related U.S. Application Data

[63] Continuation of Ser. No. 946,380, Dec. 23, 1986.

[30] Foreign Application Priority Data

Dec. 23, 1985 [JP] Japan ................. 60-291148
Jan. 13, 1986 [JP] Japan ................. 61-5504

[51] Int. Cl.⁴ .......................................... G01J 1/20
[52] U.S. Cl. .................................. 250/201; 354/408
[58] Field of Search ............... 250/201 AF, 201 PF, 250/204; 354/400, 402–405, 407, 408

[56] References Cited

U.S. PATENT DOCUMENTS

| | | | |
|---|---|---|---|
| 4,162,123 | 7/1979 | Isono | 250/201 |
| 4,171,885 | 10/1979 | Kondo | 354/405 |
| 4,255,029 | 3/1981 | Freudenchuss | 250/201 AF |
| 4,387,975 | 6/1983 | Araki | 354/407 |
| 4,395,099 | 7/1983 | Terasita | 354/430 |
| 4,415,244 | 11/1983 | Daley et al. | 354/402 |
| 4,415,246 | 11/1983 | Karasaki et al. | 354/402 |
| 4,443,078 | 4/1984 | Niwa et al. | 356/4 |
| 4,467,187 | 8/1984 | Tsunekawa et al. | 250/201 PF |
| 4,600,830 | 7/1986 | Tokutomi et al. | 250/201 PF |
| 4,633,073 | 12/1986 | Horikawa | 250/204 |
| 4,636,624 | 1/1987 | Ishida et al. | 250/201 |
| 4,670,645 | 6/1987 | Ohtaka et al. | 250/201 PF |
| 4,734,571 | 3/1988 | Hamada et al. | 250/201 |
| 4,748,469 | 5/1988 | Tamura | 250/552 |
| 4,774,401 | 9/1988 | Yamada et al. | 250/214 P |
| 4,782,239 | 11/1988 | Hirose et al. | 250/561 |

OTHER PUBLICATIONS

U.S. Ser. No. 893,101, pending in Group 257.
U.S. Ser. No. 735,569, pending in Group 255.

*Primary Examiner*—David C. Nelms
*Assistant Examiner*—Stephone B. Allen
*Attorney, Agent, or Firm*—Price, Gess & Ubell

[57] ABSTRACT

A focus condition detecting device for a camera is disclosed. The device provides first and second image sensors for calculating correlations between images each having passed through an objective lens of the camera. A plurality of image detecting blocks are defined on the first image sensor in order to execute correlation calculations with respect to each block for detecting focus conditions. A focus condition which indicates the focus condition among those obtained from the correlation calculations with use of each block is employed as the most probable focus condition. In the present invention, correlation calculations unnecessary for finding the rearmost focus condition are omitted.

9 Claims, 12 Drawing Sheets

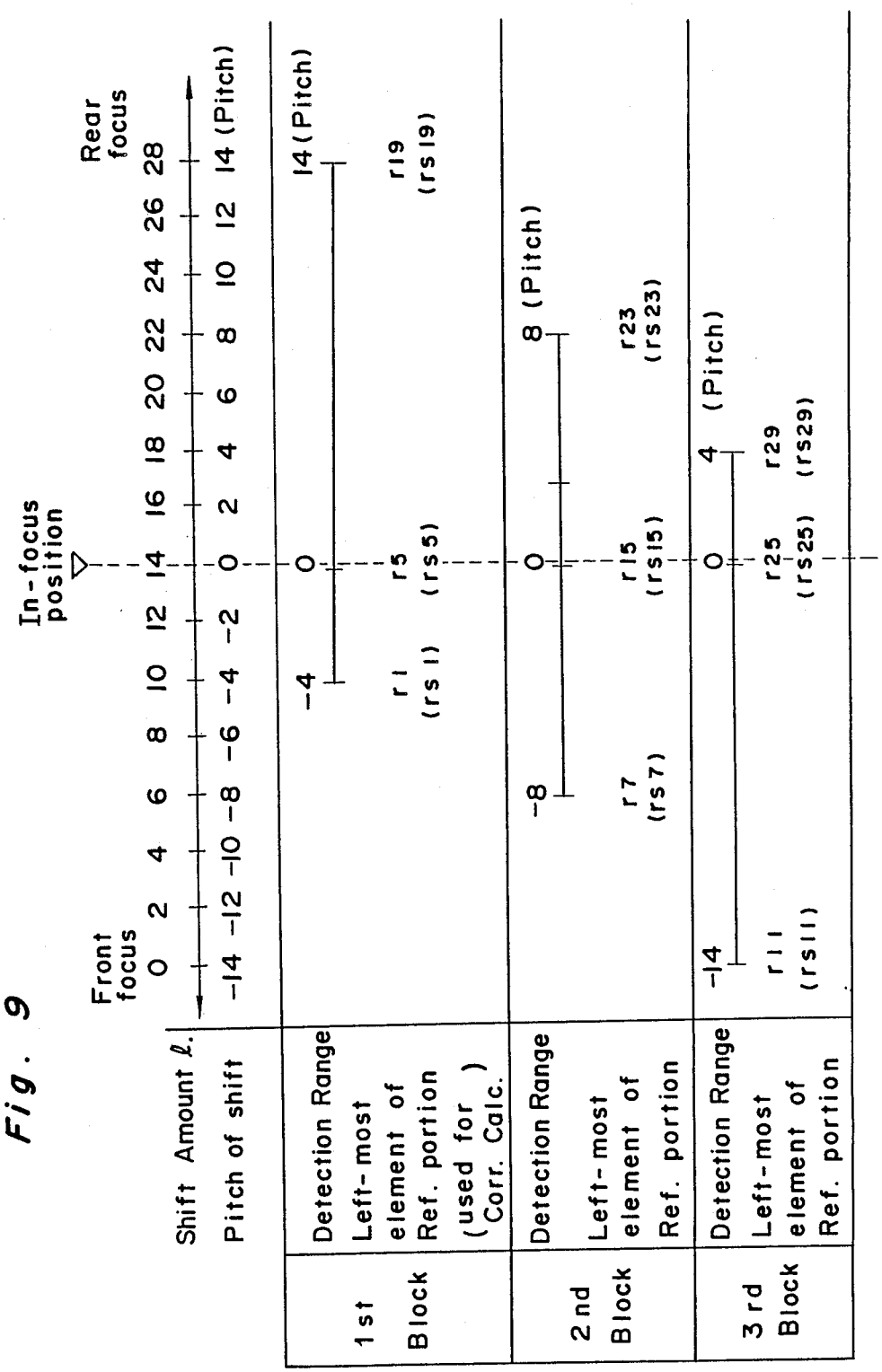

FOCUS CONDITION DETECTING DEVICE USING WEIGHTED CENTER OR CONTRAST EVALUATION

This is a continuation of application Ser. No. 946,380 filed on Dec. 23, 1986.

BACKGROUND OF THE INVENTION

1. Field of the Invention

The present invention relates to a focus condition detecting device for a camera which detects the focus condition of an objective lens of a camera via object light which had passed through the object lens.

2. Description of the Prior Art

There has been known a focus condition detecting device in which two images are formed by refocusing light bundles of object light which have passed through a first and a second area of an objective lens, each area being symmetric with respect to the optical axis of the objective lens. The relative distance between these two refocused images is calculated and the defocus amount of the focus position from a predetermined focus position and the direction of the defocus are determined based on the relative distance calculated.

A typical optical system for such a focus condition detecting device as mentioned above is shown in FIG. 1.

In this system, a condenser lens 6 is usually arranged on a predetermined focal plane 4 of an objective lens 2 or on a plane positioned behind the focal plane and two refocusing lenses 8 and 10 are arranged behind the condenser lens 6. There are arranged two image sensors 12 and 14 on each of the focal planes of two refocusing lenses. Each of the image sensors 12 and 14 is comprised of a CCD (charge coupled device) image sensor having a plurality of light sensing elements.

The condenser lens 6 is so designed that the effective ranges of the first and second refocusing lenses 8 and 10 can be extended from the exit pupil of the objective lens 2 in order to form first and second images with the light bundles which have passed through the exit pupil and first and second refocusing lenses.

As shown in FIG. 2 schematically, when an image (A) of an object is focused in front of the predetermined focal plane 4, two images a and a' are formed on the image sensors 12 and 14 relatively close to each other with respect to the optical axis 18 of the objective lens. On the other hand, when an image (B) of an object is focused to the rear of the predetermined focal plane 4, two images b, b' are formed further apart from each other. If an image is focused just on the predetermined focal plane 4, a distance between two corresponding points of the two images formed on two image sensors 12 and 14 becomes a specific value which is determined by the composition of the optical system of the focus condition detecting device. Accordingly, a focus condition of the objective lens can be determined from the distance between two corresponding points of the two images formed on the image sensors 12 and 14.

The detection of the distance mentioned above can be made as follows:

FIG. 3 shows a principle therefor schematically. As shown therein, the first and second image sensors 12 and 14 are comprised of ten and sixteen cells of photodiodes ($a_1, \ldots, a_{10}$) and ($b_1, \ldots, b_{16}$), respectively. Now, assume that each symbol of individual cell represents each output thereof. Considering now sets, each of which is comprised of ten successive cells included in the second image sensor, seven sets $B_1, b_2, \ldots B_7$ can be obtained as shown in FIG. 3. The focus condition can be sought by calculating individual correlation relation between the image received by ten cells of the first image sensor 12 and the image received by each of seven sets of the second image sensor 14.

Namely, correlation calculations are made with use of correlation functions:

$$Si = \sum_{j=1}^{10} |a_j - b_{i-1+j}| \tag{1}$$

$$(i = 1, 2, \ldots, 7).$$

For example, if the image detected by the first sensor 12($A_1$) coincides with the image detected by the first set $B_1$ of the second image sensor 14, the correlation function $S_1$ becomes minimum among the seven correlation functions $S_1, S_2, \ldots, S_7$. When a set ($S_i$) of the second sensor is found which gives the minimum value with respect to these correlation functions, the distance between the two images is determined from the identity of the set having been found to yield the minimum, and a focus condition is detected based on the distance determined. These calculations are carried out by a correlation calculation means 16.

In FIG. 4 showing a scene viewed through a viewfinder of a camera, the focus detection area A is limited to a relatively narrow center area of the field of view of the objective lens. In this case, the image of one person (main object) existing near the camera and the background image comprised of trees and a hill are entered into the focus detection area A and, due to this situation, the focus condition detecting device is liable to detect an intermediate distance between the person and the background as a correct distance of the object.

Meanwhile, in the case wherein a few objects having different distances from the camera respectively are present in the focus detection area, the main object usually exists at a position nearer than those of the subjects (background) and, usually, may be one or more persons. The subobject is usually a background of the person. Considering such an ordinary or typical object as mentioned above, the image of the main object such as a person or persons usually has a contrast higher than that of the background.

In Japanese patent laid-open publication No. 126517/1984, there is proposed a focus detecting device in which the focus detection area is divided into a plurality of blocks and a focus detection operation is carried out in every block, the credibility of the individual focus detecting operation in every block is checked, and the result obtained through the focus detecting operation having the highest credibility is employed as the focus detection area.

However, according to this focus detecting device, a long calculation time is needed since the credibility of focus condition detection has to be checked for every block.

SUMMARY OF THE INVENTION

Accordingly, it is an object of the present invention to provide a focus condition detecting device which is able to detect the most probable focus condition of an objective lens even with respect to an object having remote and close portions.

To accomplish this object, a focus condition detecting device of the present invention is provided with a plurality of light intensity distribution detecting means for detecting light intensity distributions of a plurality of object images formed by an objective lens to generate an output representing the respective detected light intensity distributions, and with defocus signal generating means for generating defocus signals, each representing the defocus condition of the object image or the amount and direction of the defocus of the object image relative to a predetermined focal plane of the objective lens, in accordance with the outputs of the plurality of light intensity distribution detecting means. Further, means is provided to determine which of the defocus signals is to be used for producing a focus condition signal representing the focus condition of the objective lens relative to the object.

This means may include a plurality of contrast detecting means for detecting contrast of a plurality of areas of the object image, respectively, selection means for selecting at least one area whose contrast is relatively higher than those of the other areas and output means for outputting the defocus signal representing the defocus condition of the area of the object image selected by the selection means, as the focus condition signal. Alternatively, the above means may include weighted center position detecting means for detecting the weighted center position of the object image in accordance with the outputs of the plurality of light intensity distribution detecting means, finding means for finding an area of the object image in which the weighted center position is located, and output means for outputting the defocus signal representing the focus condition of the area of the object image found by the finding means, as the defocus condition signal. Further, the above means may include output means for outputting one of the defocus signals which represents the rearmost focus condition among the focus conditions represented by the defocus signal, as the focus condition signal.

The above means with either of the constructions makes it possible to detect the most probable focus condition of the objective lens relative to the object even when the object is constituted by remote and close portion.

BRIEF DESCRIPTION OF THE DRAWINGS

The above and other objects and features of the present invention will become apparent from the following description of preferred embodiments of the present invention taken in conjunction with the accompanying drawings wherein:

FIGS. 8(a) and 9(b) are flow charts showing the first preferred embodiment of the present invention;

FIG. 9 is a table for showing the composition of the line image sensor;

DESCRIPTION OF THE PREFERRED EMBODIMENTS

Figure 1:
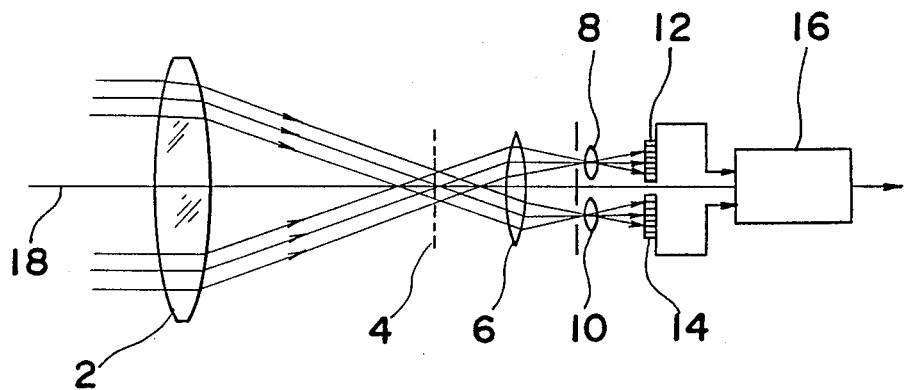
FIG. 1 is an optical system of a typical focus condition detecting device.
Figure 2:
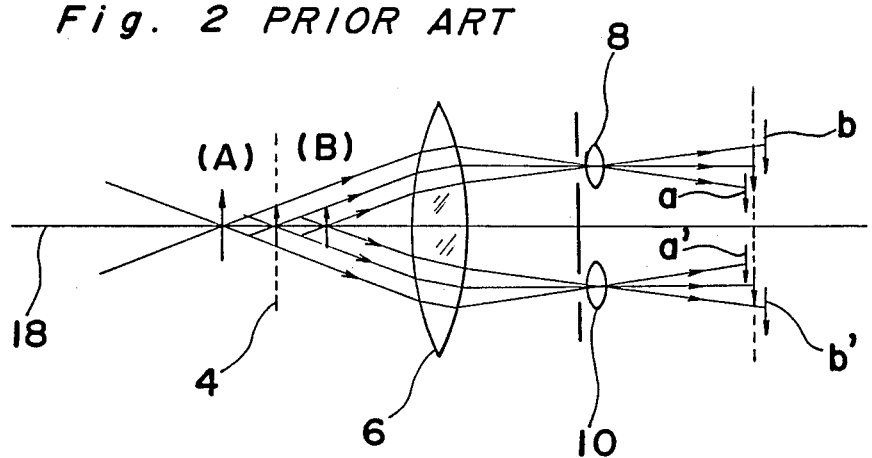
FIG. 2 is an explanative view for showing focus conditions in the optical system of FIG. 1.
Figure 3:
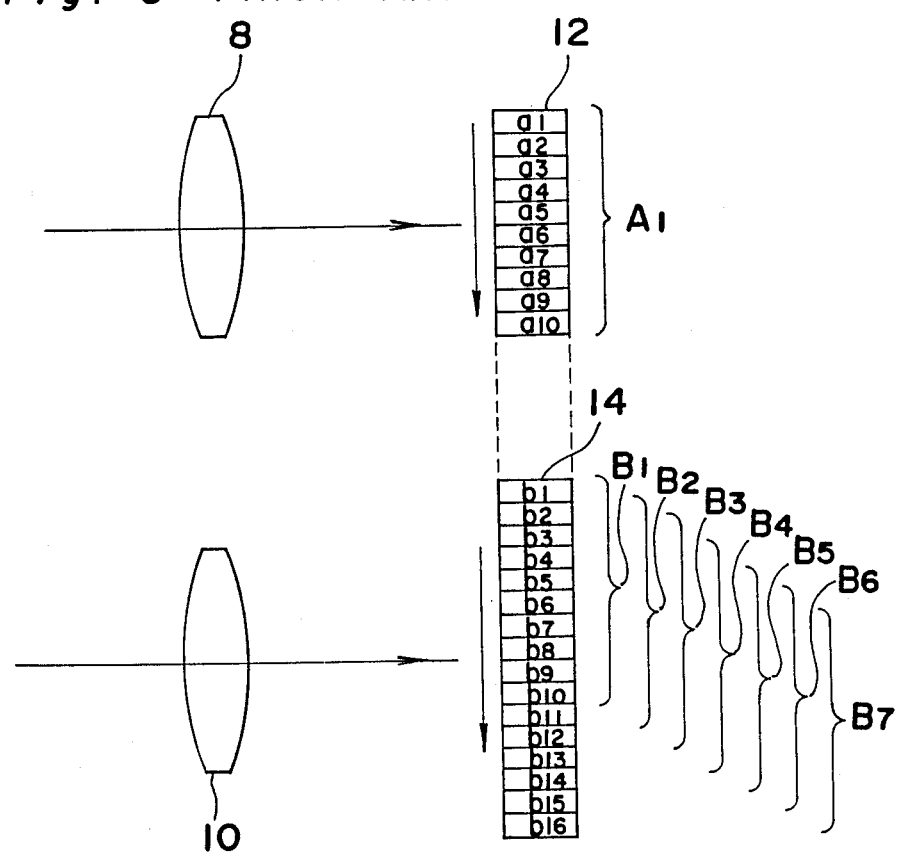
FIG. 3 is an explanative view for showing the manner of calculating the correlation between two image sensors.
Figure 4:
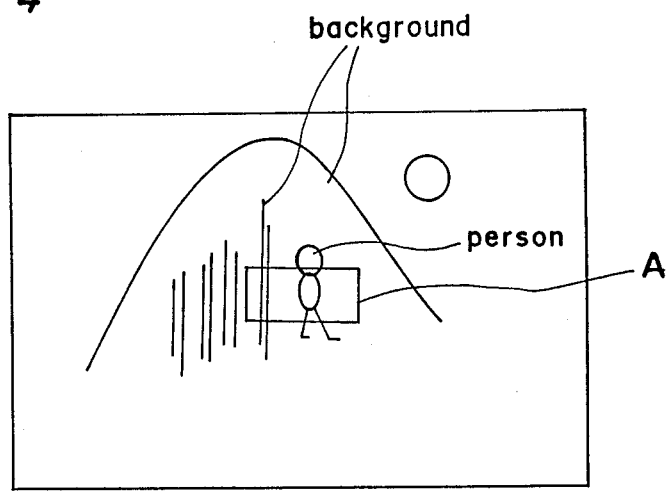
FIG. 4 is an explanative view for showing a scene viewed through a viewfinder.
Figure 5:
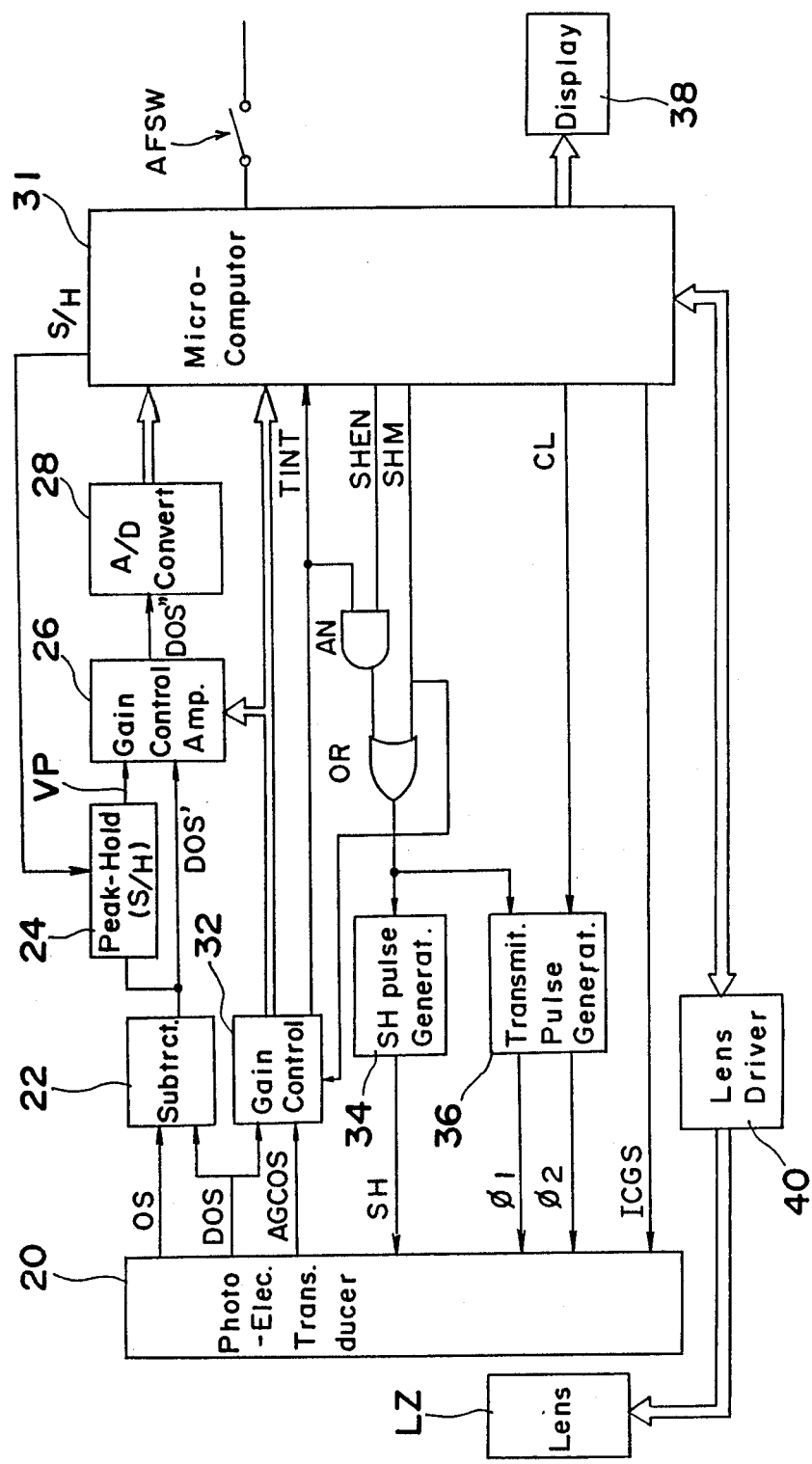
FIG. 5 is a block diagram of a focus condition detecting circuit.
Figure 6:
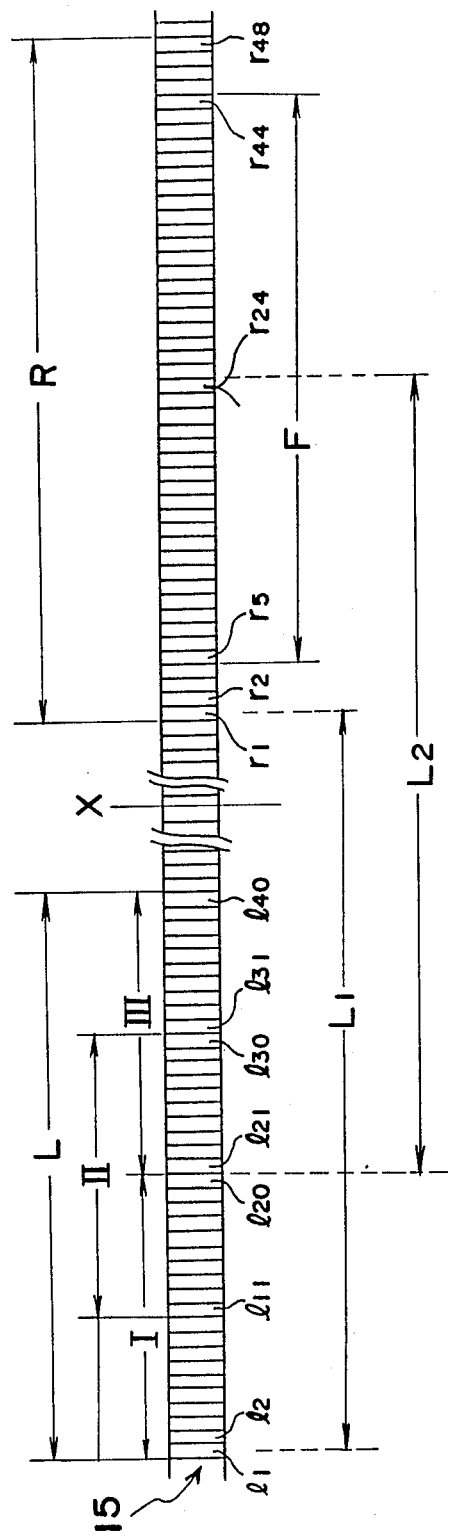
FIG. 6 is an enlarged plan view showing a composition of a line image sensor.

FIG. 5 shows a block diagram of an automatic focusing system employing a focus condition detecting device of the present invention. Though this block diagram does not include an optical system for focus condition detection, the optical system as shown in FIG. 1 is employed. A single line image sensor as shown in FIG. 6 is employed in this automatic focusing system in place of the first and second image sensor 12 and 14 of FIG. 1. In other words, the first and second image sensors 12 and 14 are formed with first and second portions L and R of the single line image sensor 15. The first portion L, comprised of forty picture elements from $1_1$ to $1_{40}$, is defined as a standard portion. The second portion R, comprised of forty-eight picture elements from $r_1$ to $r_{48}$, is defined as a reference portion. A center position X is a position at which the optical axis of the objective lens crosses.

In the standard portion L, there are defined three overlapping blocks I to III. These blocks I to III comprise picture elements from $1_1$ to $1_{20}$, from $1_{11}$ to $1_{30}$ and from $1_{21}$ to $1_{40}$, respectively. There is arranged a monitoring photoelectric element (not shown) just above the standard portion L. As shown in FIG. 6, a distance between the leftmost picture element $1_1$ of the standard portion L and the picture element $r_1$ of the reference portion R being nearest to the crossing position X of the optical axis is defined as "$L_1$".

Further, the optical system employed is designed so that an image having a light intensity distribution equal to that of an image formed on the second block II of the standard portion L might be formed in a range defined between $r_5$ and $r_{44}$ of the reference portion R when the objective lens of the camera is in-focus with respect to an object, namely an object image is focused on the predetermined focal plane thereby. Accordingly, the range defined from the picture element $r_5$ to the picture element $r_{44}$ is defined as "in-focus block" F. A distance from the center picture element $1_{21}$ of the standard portion L to the center picture element $r_{24}$ of the in-focus block F is defined as "image distance $L_2$ of in-focus state."

Returning to FIG. 5, a control circuit 31 consisting of a microcomputer starts a focus condition detecting operation when a shutter release button (not shown) is pushed down by a half stroke thereof while a switch for the focus condition detecting mode is turned ON.

At first, an integration clear pulse signal ICGS is outputted from the control circuit 31 to a CCD image sensor provided in a photoelectric transducer circuit 20 and having the arrangement as shown in FIG. 6. Due to this signal, all picture elements of the CCD image sensor are reset to initial states and an output AGCOS of a brightness monitoring circuit (not shown) housed in the CCD image sensor to receive an output of the monitoring photoelectric element referred to above is set up to the level of the voltage of the power source. At the same time, the control circuit 31 outputs a permission signal SHEN of "High" level for permitting a shift pulse generator 34 to generate a shift pulse. As soon as the integration clear signal ICGS disappears, integration of photocurrent is started in every element of the CCD image sensor. At the same time, while the output AGCOS of the brightness monitoring circuit in the photoelectric transducer circuit begins to drop with a velocity corresponding to the intensity of light incident on the monitoring photoelectric element, a reference signal DOS generated by a reference signal generating circuit (not shown) provided in the photoelectric transducer circuit 20 is kept at a constant reference level. A gain control circuit 32 compares the output AGCOS with the reference signal DOS and controls the gain of a differential amplifier 26 of a gain variable type according to the amount of drop of the output AGCOS relative to the reference level DOS within a predetermined time interval (for instance, it is set to 100 msec upon the focus condition detecting operation). The gain control circuit 32 outputs a signal TINT of "High" level as soon as it detects that AGCOS signal has dropped to a level equal to or lower than a predetermined level against the reference level DOS within the predetermined time interval starting from the disappearance of the integration clear signal ICGS. The signal TINT is input to a shift pulse generating circuit 34 via an AND gate (AN) and an OR gate (OR), and the shift pulse generating circuit 34 outputs a shift pulse SH in response thereto. When the shift pulse SH is input to the photoelectric transducer 20, the integration operation of photocurrent by each light sensing element of the CCD image sensor is stopped, and then charges accumulated in each light sensing element corresponding to integrated values of the photocurrent are transmitted parallel to cells in a shift register provided in the CCD image sensor so as to correspond one to one to the light sensing elements of the CCD image sensor.

Further, a transmission pulse generating circuit 36 outputs two sensor driving pulses $\phi1$ and $\phi2$ having phases different from each other by 180° in a manner synchronized with clock pulses CL from the control circuit 31. The CCD image sensor in the photoelectric transducer circuit 20 outputs signals OS forming image signals respectively by discharging a charge of each cell of the CCD shift register serially in the order of alignment of elements. This OS signal has a higher voltage as an intensity of incident light to a corresponding element is weaker. A subtraction circuit 22 subtracts OS signal from DOS signal and outputs the difference (DOS−OS) as a picture element signal.

If, however, the predetermined time interval has elapsed without receipt of a TINT signal after the disappearance of ICGS signal, the control circuit 31 outputs an instruction signal SHM for generating a shift pulse of "High" level. Therefore, in this case, the shift pulse generating circuit 34 generates a shift pulse SH in response to this instruction signal SHM.

Further, the control circuit 31 outputs a sample-hold signal S/H when element signals from the seventh to the tenth element are outputted. This area of the CCD image sensor corresponding to these elements is covered with an aluminum mask, so that these elements integrated only dark currents inherent to the CCD image sensor. Namely, these picture elements are masked from the incident light. A peak hold circuit 24, when the sample hold signal S/H is applied thereto, holds a difference between the reference signal DOS and one of output signals from the seventh to tenth elements covered with the aluminum mask. Thereafter, the difference VP and element signal DOS' are input to the gain variable amplifier 26. That gain variable amplifier 26 amplifies a difference (VP−DOS') between VP and DOS' with a gain controlled by the gain control circuit 32. The amplified signal DOS" is converted from analog data to digital data by an A/D converter 28 and digital data are applied to the control circuit 31 as picture element signal data. Though the A/D conversion by the A/D converter is done in a unit of eight bits, data are transmitted to the control circuit four bits at a time, first the top four bits and then the bottom four bits.

The control circuit 31 stores these picture element signal data in an internal memory and, when all the element signal data have been stored therein, processes those data according to programs set therein to calculate a defocus amount and a direction of defocus, to display these data on a display 38 and to drive a lens driving device 40 according to the defocus amount and the direction thereof in order to effect an autofocusing adjustment of the objective lens.

Data with respect to the focus condition of the objective lens obtained by the calculation operation of the control circuit 31 are a defocus amount and defocus direction. Based on these data, a driving amount and direction of the objective lens driven by the lens driving device 40 are determined. While the lens driving device 40 drives the objective lens according to the driving amount and direction, it outputs signals corresponding to the driven amounts of the objective lens. The control circuit 31 detects an actual driven amount from the signals and, when it becomes equal to the determined driving amount, outputs a signal for stopping the lens driving to the lens driving device.

A switch AFSW is provided to input a start signal for starting the detection of defocus amount and the automatic focus adjustment due to the defocus detection.

Figure 7:
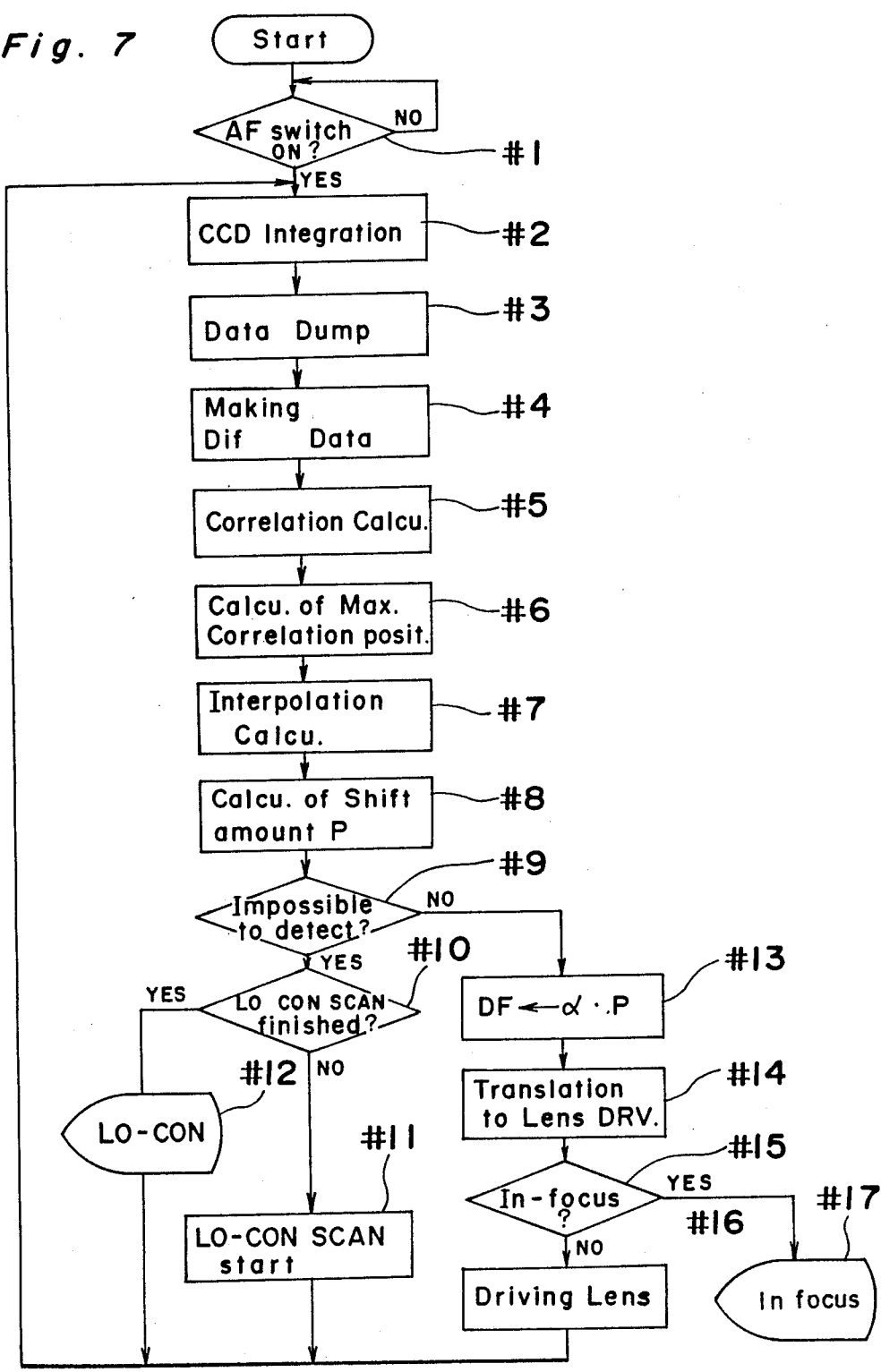
FIG. 7 is a flow chart showing a main routine program for focus condition detection according to the present invention.

FIG. 7 shows a flow chart of a main routine program to be executed by the control circuit.

The program is started when electric power is supplied from the battery loaded in the camera to the control circuit by switching the power switch (not shown) ON.

The control circuit waits until the AF switch (AFSW) is switched ON at step #1 and, when the AF switch has been switched ON, starts an integration operation by the CCD image sensor at step #2.

When the integration operation has been completed in response to the shift pulse SH, output signals from picture elements of the image sensor are successively outputted as image signals (OS) at data dump step #3. Each image signal is converted to a picture element signal by the subtracting circuit 22, and then converted to digital data by the A/D converter 28 after having been amplified with a gain corresponding to the brightness of the object.

At step #4, differential data are calculated from picture element signals in order to remove low-frequency signal components contained in picture element signals.

Then, the correlation calculations between the standard L and reference portion R are made with use of differential data at step #5 and, at step #6, a range of the reference portion R showing the highest correlation is determined.

Further, an interpolation calculation is carried out in order to obtain a shift amount of image distance having a higher precision at step #7, and then the shift amount P of image distance is calculated at step #8. At step #9, it is decided whether or not the shift amount P obtained at step #9 has reasonable credibility, i.e., whether or not a reasonable focus condition detection is possible. If it is decided that a reasonable focus condition detection is impossible at step #9, it is decided whether or not a low-contrast scanning has been completed. This low-contrast scanning is provided as a countermeasure against such a case that the defocus amount is too large to perform the focus condition detection. In this operation, the objective lens is driven in one axial direction while repeating focus condition detections, and when the defocus amount detected falls within a range wherein the focus condition detection can be done exactly, the objective lens is driven to its in-focus position based on the shift amount of image distance having been detected at that time.

If the low-contrast scanning has been completed already at step #10, the display device is operated to display "Low-Contrast" at step #12 and the program returns to step #2. If the low-contrast scanning has not been completed yet, the low-contrast scanning is started at step #11, and then the program returns to step #2.

If it is decided that the focus condition detection is possible at step #9, the shift amount of image distance is transformed into the defocus amount DF at step #13 and, further, the defocus amount is transformed to the lens driving amount DF at step #14. At step #15, it is decided whether or not the defocus amount or driving amount having been sought falls within a predetermined in-focus range. If it falls within the in-focus range, the display device is operated to display "In-Focus" at step #17.

If it is not in-focus, the objective lens is driven according to the driving amount sought at step #14, and then the program returns to step #2.

Since these steps mentioned above are disclosed precisely in U.S. Pat. No. 4,636,624 assigned to the same assignee as the present application, only portions related to the present invention will be explained in detail hereinafter.

Figure 8A:
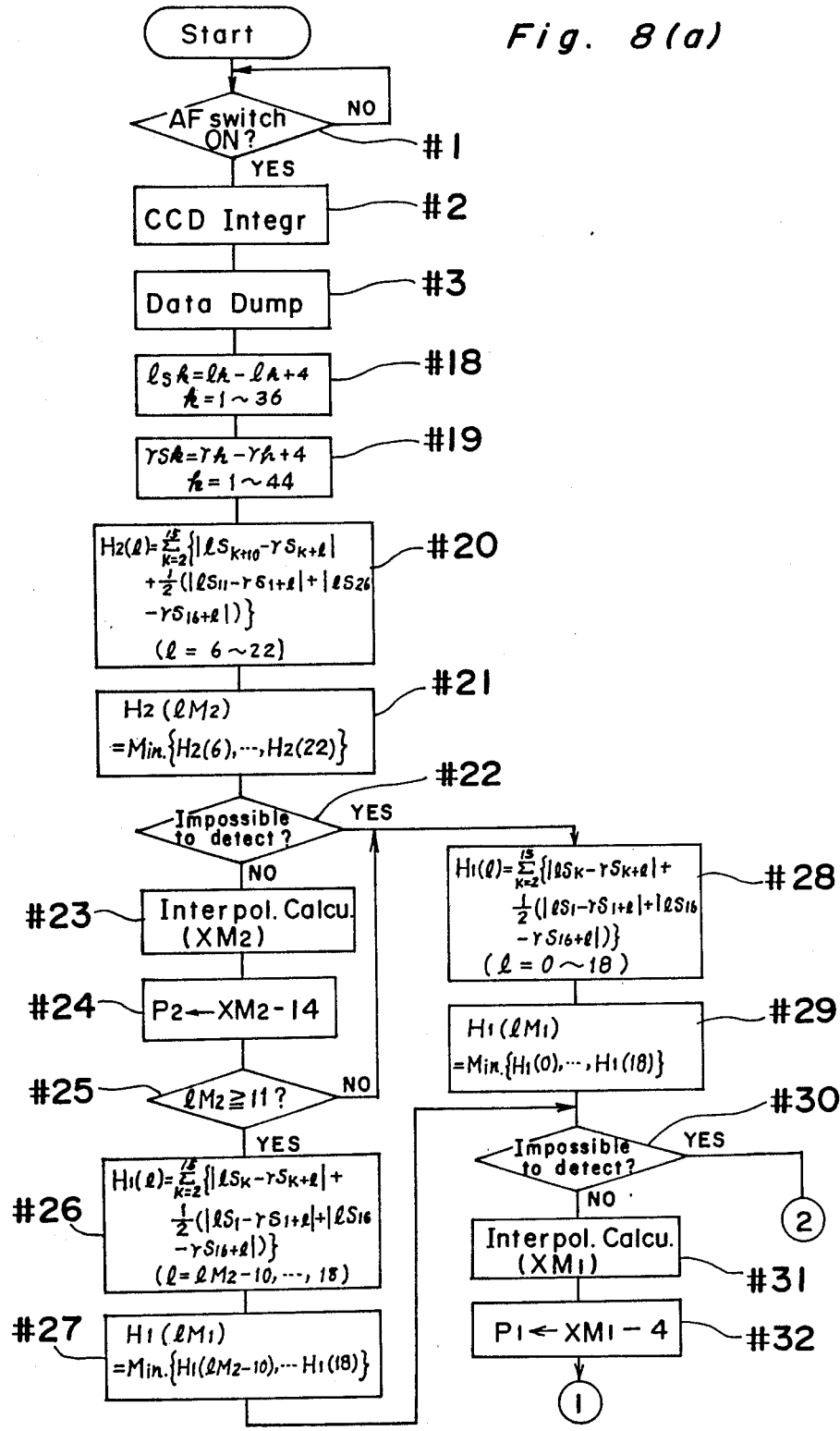
Figure 8B:
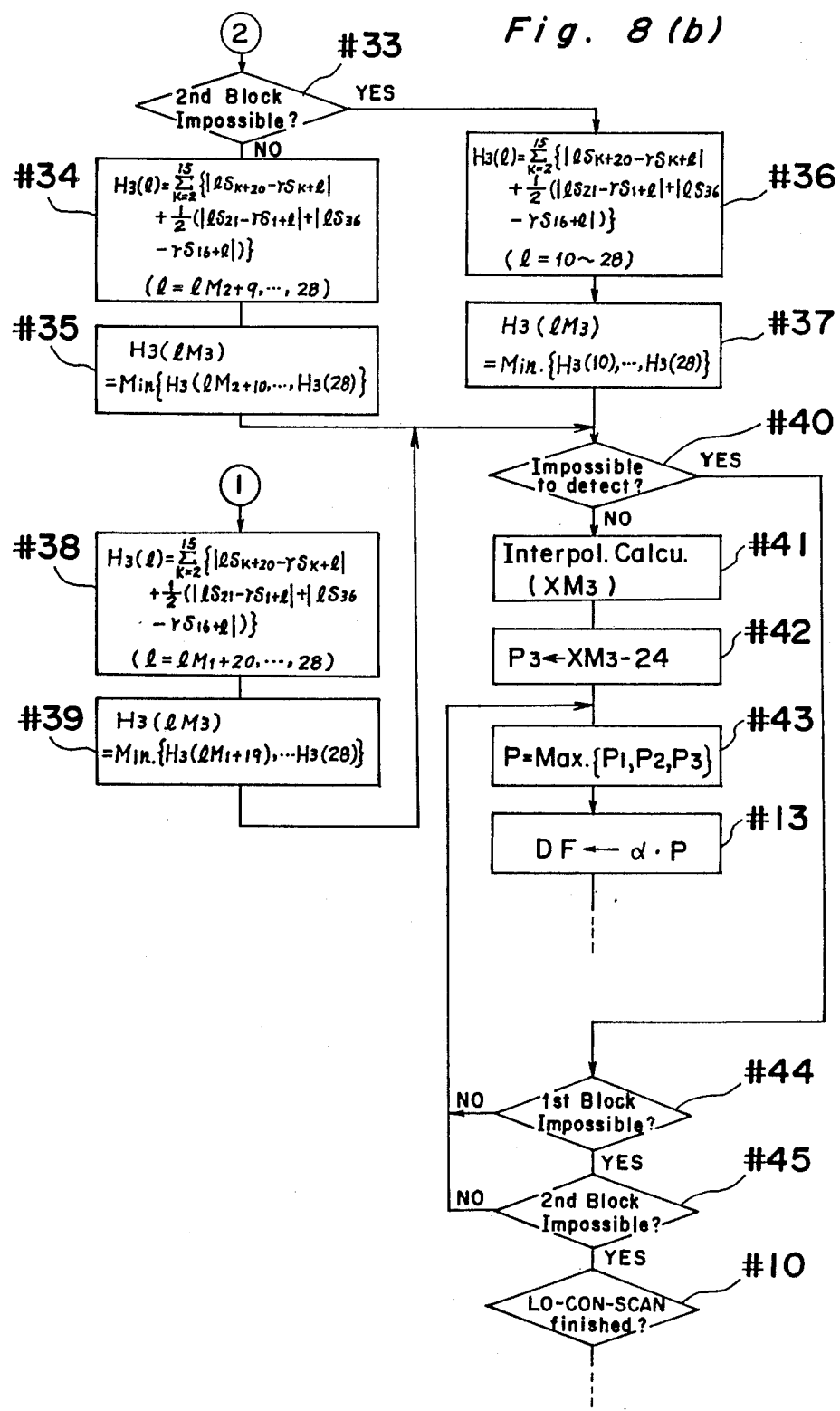

FIGS. 8(a) and 8(b) show a flow chart of the focus condition detection program according to the preferred embodiment of the present invention.

According to the preferred embodiment, the standard portion is divided into three blocks, a shift amount of image distance is calculated with respect to every block, a shift amount of image distance corresponding to the rearmost focus condition is chosen as a correct value among three shift amounts obtained, and the objective lens is driven according to the shift amount chosen.

As previously mentioned with respect to FIG. 6, three blocks I, II and III are defined in the standard portion L of the CCD image sensor. Detection ranges wherein shift amounts can be detected with use of these three blocks are set so as to overlap each other, as is clearly shown in FIG. 9 and in the following table.

TABLE

| | | Area of Pic Element | Diff. Data | Left Most Elem. for Corr. Calc. | Dect. Area for Image Dist. Error (Max) |
|---|---|---|---|---|---|
| Stand. Port. (L) | First Block (I) | l1 ~ l20 | lS1 ~ lS16 | r5 (rs5) | −4 ~ 14 pitch |
| | Second Block (II) | l11 ~ l30 | lS11 ~ lS26 | r15 (rs15) | −8 ~ 8 pitch |
| | Third Block (III) | l21 ~ l40 | lS21 ~ lS36 | r25 (rs25) | −14 ~ 4 pitch |
| Ref. Port. (R) | All | r1 ~ r48 | rS1 ~ rS44 | | |

Returning to FIG. 8(a), when the AF switch is turned on, the program proceeds to step #18 after passing steps #1 to #3. At step #18, differential data $1_{sk}$ are calculated with the use of every fourth picture element signal ($1_{sk}=1_k-1_{k+4}$) obtained by picture elements of the standard portion. Also, differential data $r_{sk}(=r_k-r_{k+4})$ are calculated with respect to the reference portion R at step #19. This preprocessing of picture element signals is done in order to remove low-frequency error factors accompanied by spatial frequency components of the light intensity distributions on the standard and reference portions (L and R) which are caused by errors from the specification of the optical system for detecting the focus condition. Since this preprocessing is disclosed in detail in the above-mentioned U.S. Pat. No. 4,636,624, further explanation thereof is omitted.

Next, at step #20, the correlation calculation is made with use of the differential data belonging to the second block II of the standard portion (L) and the differential data belonging to the range of the reference portion (R) defined from (−8)th to (+8)th pitch when seen from the center in-focus position, respectively (FIG. 9). In the equation for the correlation calculation, 1 represents a shift amount by which the differential data belonging to the second block II of the standard portion (L) are shifted relative to the differential data belonging to the above range of the reference portion (R).

At step #21, there is sought with use of correlation functions obtained at step #20 position (i.e., a shift amount) $1M_2$ on the reference portion (R), which gives the highest correlation.

It is decided whether or not results obtained at steps #20 and #21 have a high credibility, namely whether or not the focus condition detection is possible. If it is decided that detection is possible, an interpolation calculation is made to seek a position $XM_2$, which is more accurate than the position $1M_2$ at step #23, and then the deviation amount $P_2$ of image distance is calculated from the position $XM_2$.

At step #25, before executing a correlation calculation with use of the first block I, it is decided whether the position $1M_2$ which gives the highest correlation with respect to the second block II locates within the range which permits the correlation calculation with use of the first block I. The position of 1=l1 is the frontmost focus position which permits the correlation calculation with use of the first block I.

If $1M_2 < l1$, the program proceeds to step #28 in order to execute correlation calculation with use of the full detection range set for the first block I and defined from $(-4)$th to $(+14)$th pitch, since this fact suggests that the position $1M_2$ obtained by the correlation calculation of step #20 locates on the front focus side with respect to the detection range set for the first block I. At step #29, a position $1M_1$ which gives the highest correlation with respect to the first block I is found.

If it is decided at step #22 that the focus condition detection is impossible, the program also proceeds to steps #28 and #29.

If it is decided at step #25 that $1M_2$ is equal to or larger than eleven ($1M_2 > 11$), the program proceeds to steps #26 and #27.

In this case, the correlation calculation is made with the use of a portion of the detection range set for the first block I and defined from ($1M_2 - 10$)th pitch to 18th pitch in order to shorten a calculation time needed for the correlation calculation with the use of the first block I by omitting correlation calculation which might give a position locating on the front focus side with respect to the position indicated by the $1M_2$ having been obtained at step #21. At step #27, a position $1M_1$ which gives the highest correlation is calculated therefrom.

At step #30, it is decided whether or not the focus condition detection is possible with respect to the first block I. If it is decided to be possible, the program proceeds to steps #31 and #32 in order to calculate a deviation amount $P_1$ of image distance with a high precision by executing an interpolation calculation.

Then, the program proceeds to step #38 of FIG. 8($b$) in order to execute the correlation calculation with use of the third block III. Since the position $1M_1$ obtained by the correlation calculation with use of the first block I locates within the detection range set for the third block III or rear focus side thereof, a range which is on the front focus side relative to the position $1M_1$ determined by the correlation calculation with use of the first block I is omitted from the correlation calculation with use of the third block III in order to shorten a calculation time needed therefor.

Although not shown in FIGS. 8($a$) and 8($b$), if $1M_1 > 8$, the program jumps to step #44 by skipping steps #38 and #39, since in this case there is no range which permits the correlation calculation with use of the third block III.

If it is decided at step #30 of FIG. 8($a$) that the correlation calculation with use of the first block I is impossible, the program proceeds to step #33 of FIG. 8($b$) to decide whether or not the correlation calculation with use of the second block II was possible. If it is decided to be possible, the program proceeds to steps #34 and #35 in order to execute the correlation calculation with use of the third block III. Also, in this case, a range of the third block III which is on the front focus side of the position $LM_2$ which had been obtained by the correlation calculation with use of the second block II is omitted from the correlation calculation with use of the third block III.

Although not shown in FIGS. 8($a$) and 8($b$), if $1M_2 > 18$, namely there is no available range for the correlation calculation with use of the third block III, the program jumps to step #44 without executing steps #34 and #35.

If it is decided at step #33 that focus detection is impossible with use of the second block II, the program proceeds to step #36 in order to execute the correlation calculation over the full range of the reference portion R set for the third block III and, at step #37, a position $1M_3$ is calculated, which gives the highest correlation with respect to the third block III.

Next, it is decided at step #40 whether or not the correlation calculation with use of the third block III has reasonable credibility. If it has reasonable credibility, the program proceeds to step #41 to execute an interpolation calculation in order to obtain a deviation amount $P_3$ of image distance with a high precision due to the interpolation calculation. At the next step #43, the maximum value of three deviation amounts $P_1$, $P_2$, $P_3$ of image distance which gives the rearmost focus position is chosen as the most probable deviation amount P of image distance. If either of these values is impossible to calculate, the maximum value is chosen from the rest of the values.

Next, the program returns to step #13 of FIG. 7 in order to calculate a defocus amount Df based on the most probable deviation amount P of image distance.

If it is decided that the correlation calculation does not have reasonable credibility, the program proceeds to step #44 in order to decide whether or not the correlation calculation with use of the first block I has reasonable credibility. Then, at step #45, it is also decided whether or not the correlation calculation with use of the second block II has reasonable credibility.

If it is decided at either one of steps #44 and #45 that the correlation calculation has reasonable credibility, the program proceeds to step #43 to calculate the most probable deviation amount P of image distance.

If none of the correlation calculations with use of the first, second and third blocks have reasonable credibility, the program proceeds to step #10 of FIG. 7 to execute the low-contrast scanning.

It is desirable to calculate correlation functions $Hn(1min-1)$) and $Hn(1min+1)$ adjacent to the minimum correlation function $Hn(1min)$ before executing the interpolation calculation at step #23, #31 or #41, wherein $(1min-1)$ represents $(1M_1-1)$, $(1M_2-1)$ and $(1M_3-1)$, while $(1min+1)$ represents $(1M_1+1)$, $(1M_2+)$ and $(1M_3+1)$. This enables calculation of a focus position in a range defined from $(1min-0.5)$ pitch to $(1min+0.5)$ pitch.

Figure 10:
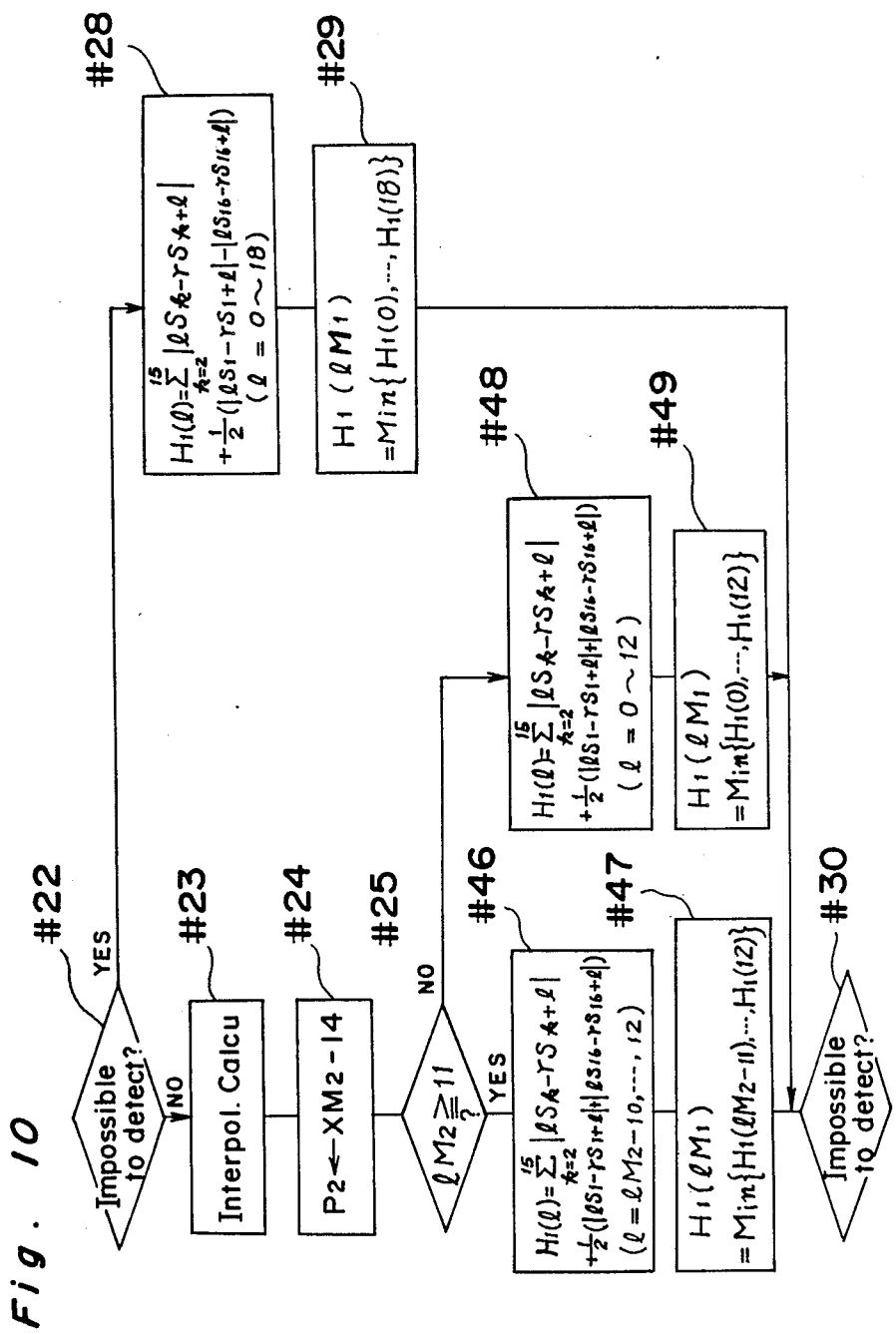
FIG. 10 is a flow chart for showing the second preferred embodiment of the present invention.

FIG. 10 shows a flow chart of the second preferred embodiment of the present invention. In this embodiment, the detection range of the first block I is changed according to the possibility of focus condition detection with use of the second block II. If the focus condition detection with use of the second block II is impossible, the detection range of the first block I is set wide in order to improve the probability of detection as shown at step #28, since a focus position might be shifted from the normal in-focus position considerably in such a case as mentioned above. Contrary to the above, if it is possible to detect a focus position with use of the second block II, the detection range of the first block I is narrowed at steps #46 or #48 in order to reduce a calculation time. Although in consideration of the objects located at far and near distances the detection range in this case is set so as to include a range which is on the rear focus side with respect to a shift amount $1M_2$ having been sought with use of the second block II, too, it is not necessary to set such a wide detection range as set in the case that the focus condition detection with use of the second block II is impossible. Actually, the correlation calculation is terminated at $1=12$.

Figure 11:
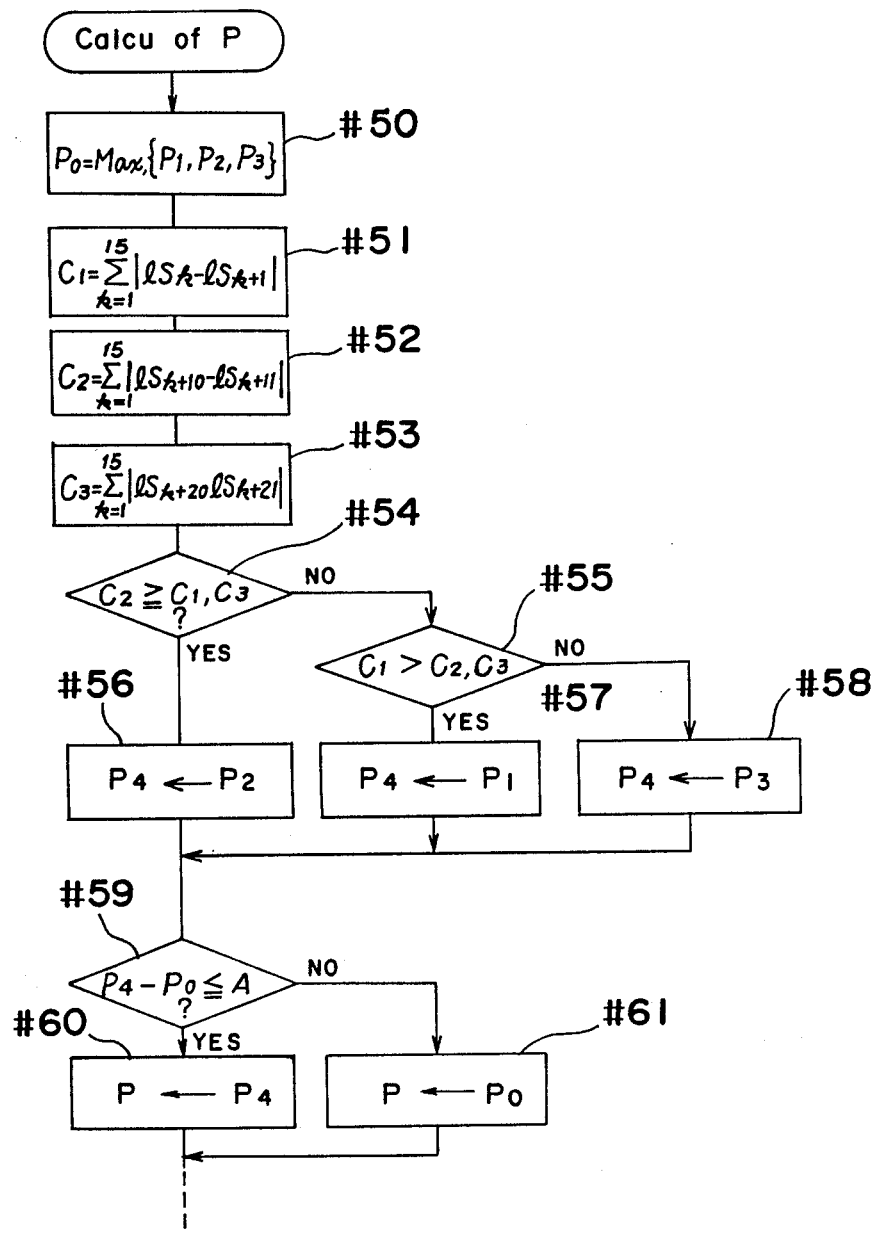
FIG. 11 is a flow chart for showing the third preferred embodiment of the present invention.

FIG. 11 shows a flow chart of the third preferred embodiment of the present invention in which the method for determining the most probable value p of the deviation amount of image distance is changed from that of the first preferred embodiment shown at step #43 of FIG. 8(b).

As previously explained, the deviation amount of image distance indicating the rearmost focus position is chosen among those obtained in the first preferred embodiment. However, there is a possibility that the detection precision is lowered, since an error contained in the deviation amount of image distance obtained is enlarged when the contrast of object becomes low, such as in a case where an object has a flat surface.

This preferred embodiment is considered as a countermeasure against the above-mentioned problem. According to this embodiment, the maximum value chosen among deviation amounts ($P_1$, $P_2$, $P_3$) of image distance is compared with the deviation amount $P_4$ of image distance which is obtained with use of the block with which the highest contrast is detected among blocks I to III, and if the difference between Max ($P_1$, $P_2$, $P_3$) and $P_4$ is smaller than or equal to a predetermined value, $P_4$ is employed as the most probable value of the shift amount of image distance.

As shown in FIG. 11, the maximum value $P_0$ is chosen among deviation amounts $P_1$, $P_2$ and $P_3$ of image distance obtained with use of the first, second and third blocks at step #50. Next, at steps #51, #52 and #53, contrast values $C_1$, $C_2$ and $C_3$ of contrast on the first to third blocks I to III are calculated with use of differential data (1sk), respectively. Then, these contrast values are compared with each other to find the maximum value at steps #54 and #55 and the deviation amount of image distance obtained from the block having the maximum contrast is chosen as $P_4$ at step #56, #57 or #58. Then, a difference between $P_0$ and $P_4$ is compared with the predetermined value A at step #59, and if the difference ($P_4-P_0$) is smaller than or equal to A, $P_4$ is set as the most probable deviation amount P of image distance at step #60. If it is larger than A, $P_0$ {=Max ($P_1$, $P_2$, $P_3$)} is set as the most probable shift amount P.

Figure 12:
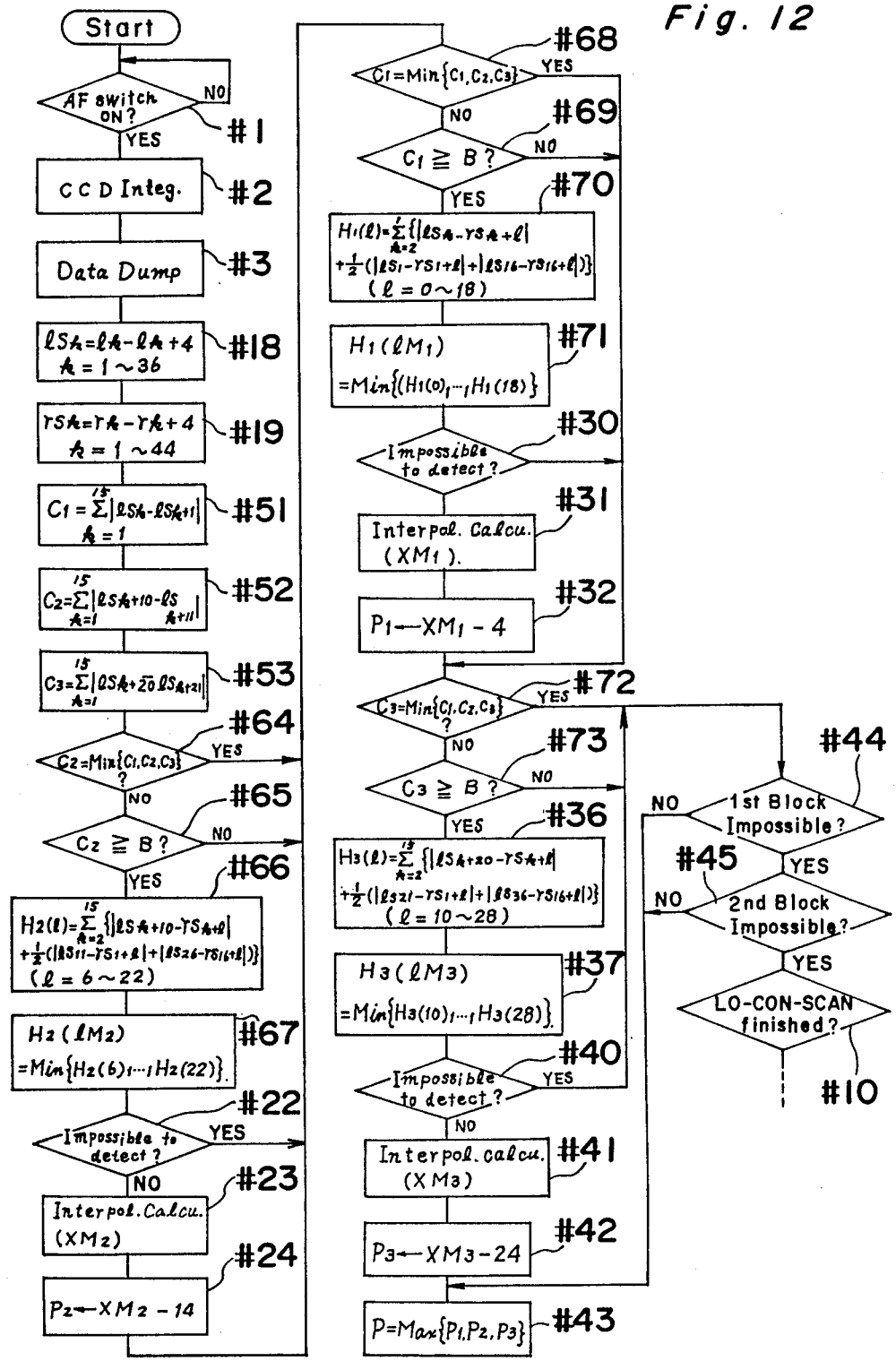
FIG. 12 is a flow chart for showing the fourth preferred embodiment of the present invention.

FIG. 12 shows a flow chart of the fourth preferred embodiment of the present invention. This embodiment is intended to shorten a calculation time necessary for the focus condition detection calculation. In order to achieve that, the correlation calculation is done with the use of the two blocks among three blocks having higher contrasts. Further, if the contrast value of every block is smaller than a predetermined value, the correlation calculation is prohibited, since the credibility thereof is considered too low.

As shown in FIG. 12, steps #1 to #19 are the same as those of FIG. 8(a). Accordingly, explanations about these steps are omitted.

Next, at steps #51, #52, #53, contrast values $C_1$, $C_2$ and $C_3$ of the contrasts on the first to third blocks are calculated, respectively. At step #64, it is decided whether or not the contrast value $C_2$ is minimum among contrast values ($C_1$, $C_2$, $C_3$). If it is minimum, the correlation calculation with use of the second block is omitted and the program proceeds to step #68 in order to execute the correlation calculation with use of the first block I.

If $C_2$ is not minimum, it is decided at step #65 whether or not $C_2$ is equal to or larger than a predetermined limit value B of contrast.

If $C_2$ is smaller than B, the program proceeds to step #68 to execute the correlation calculation with use of the first block I.

If $C_2$ is equal to or larger than B, the correlation calculation with use of the second block II is done at step #66 and a position (shift amount 1) which gives the maximum correlation is found out at step #67. At the next step #22, it is decided whether or not the credibility of the correlation calculation is high enough for determining a focus condition, namely whether or not the focus condition detection is possible.

If it is decided that the focus condition detection is possible, an interpolation calculation for obtaining a more accurate correlation position $XM_2$ is done at step #23 and, at step #24, a deviation amount $P_2$ of image distance is calculated with respect to the second block.

Then the program proceeds to steps #68 and #69 to decide whether or not $C_1$ is minimum among $C_1$, $C_2$ and $C_3$ and to decide whether or not $C_1$ is equal to or larger than B if $C_1$ is not minimum. If either condition is not satisfied, the correlation calculation with use of the first block I is omitted and the program jumps to step #72 to execute the correlation calculation with the use of the third block III.

If both conditions are satisfied, the correlation calculation with use of the first block I is executed at steps #70 and #71 and it is decided at step #30 whether or not the focus condition detection is possible. If possible, an interpolation calculation for calculating a more accurate correlation position $XM_1$ is done at step #31, and then a deviation amount $P_1$ of image distance is calculated at step #32 with respect to the first block I.

Next, the program proceeds to step #72 to execute the correlation calculation with use of the third block III. If it is decided to be impossible at step #30, the program also proceeds to step #72.

Then the program proceeds to step #68 in order to execute the correlation calculation with use of the first block I. At step #68, it is decided whether or not the contrast $C_1$ is minimum. If it is not, the contrast $C_1$ is compared with the predetermined value B at step #69.

If either condition is not satisfied at step #68 or step #69, the program jumps to step #72 in order to execute the correlation calculation with the third block III without executing the correlation calculation with use of the first block I.

If both conditions of steps #68 and #69 are satisfied, the program proceeds to step #70 in order to execute the correlation calculation with use of the full range of the first block I. At step #71 the maximum correlation position $1M_1$ is determined therefrom. Then, at step #30, it is decided whether or not the correlation calculation with use of the first block I has reasonable credibility.

If it has reasonable credibility, a shift amount $P_1$ of image distance is calculated at step #32 after executing an interpolation calculation at step #31.

Next, the program proceeds to step #72 in order to execute the correlation calculation with use of the third block III. If it is decided that the correlation calculation at steps #70 and #71 does not have reasonable credibility, the program jumps to step #72.

Similarly to the case of the first and second blocks, the contrast $C_3$ is checked whether or not it is below a minimum at step #72 and whether equal to or larger than B at step #73. Then the correlation calculation with use of the third block is executed at step #36, and at step #37 the maximum correlation position $1M_3$ is sought. After an interpolation calculation at step #41, a shift amount $P_3$ of image distance is calculated at step #42.

Then, at step #43, the maximum value among $P_1$, $P_2$ and $P_3$ is determined to be the most probable deviation amount $P_0$. If either one of deviation amounts $P_1$, $P_2$ and $P_3$ of image distance is impossible to calculate, it is excepted from the calculation. Then the program returns to step #13 of FIG. 7.

On the contrary to the above, if the correlation calculation at steps #36 and #37 does not have reasonable credibility, the program proceeds from step #40 to steps #44 and #45 in order to check whether each of the correlation calculations with use of first and second blocks I, II had reasonable credibility at either step #44 or #45, the program proceeds to step #43 to calculate the most probable deviation amount P of image distance. If all of the correlation calculations are decided to have had no reasonable credibility, the program proceeds to step #10 to execute the low-contrast scanning as mentioned with regard to FIG. 7.

According to the present embodiment, the focus condition detection calculations are carried out with use of only two blocks having contrasts higher than that of a third one. Therefore, the total calculation time of the focus condition is reduced considerably. However, it is also possible to limit the focus condition detection to the block having the highest contrast among contrasts of three blocks.

Figure 13:
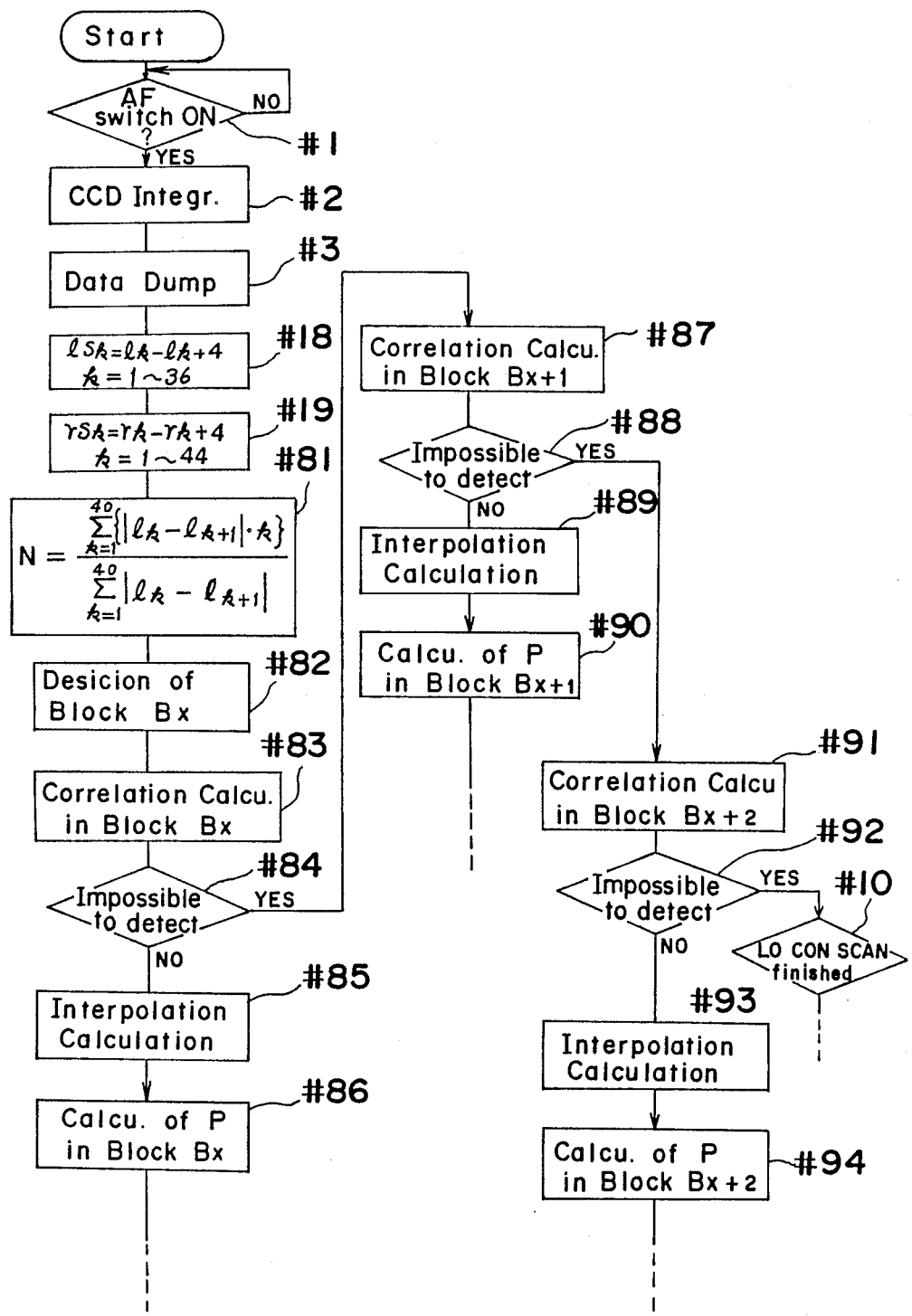
FIG. 13 is a flow chart for showing the fifth preferred embodiment of the present invention.

FIG. 13 is a flow chart showing one more preferred embodiment.

In this embodiment, a weighted center position N of the light intensity distribution over the whole range of the standard portion L of the image sensor is calculated at step #81 according to the following equation:

$$N = \frac{\sum_{k=1}^{40} \{|1_k - 1_{k+1}|k\}}{\sum_{k=1}^{40} |1_k - 1_{k+1}|}$$

Then, at step #82, it is determined to which block the weighted center position N belongs. The focus condition detection calculation is executed through steps #83 to #86 with use of only the block Bx determined at step #82.

Although the weighted center position N is calculated with the use of picture element signals, it is also possible to calculate a weighted center position with use of the differential data obtained at step #18. If the result of focus condition obtained with use of the block Bx does not have reasonable credibility, the program proceeds from step #84 to step #87 in order to execute a focus condition detection calculation with the use of the next detection block $B_{x+1}$ through steps #87 to #90.

If the result of focus condition obtained with use of the block $B_{x+1}$ does not have reasonable credibility, a focus condition detection calculation is executed with use of the remaining $B_{x+2}$ through steps #90 to #94.

When the deviation amount P of image distance has been sought at either step #86, #90 or #94, the program proceeds to step #13 of FIG. 7.

According to this preferred embodiment, it becomes possible to increase the probability in the focus condition detection even in the case where a close object and a remote object are coexisting and, further, the calculation time is shortened considerably.

It is to be noted that the number of detection blocks of the standard portion is not restricted to three, and can be two or four. Also, it is to be noted that each detection block is not necessarily set so as to overlap with another block. Further, in place of the single line image sensor, there may be provided a plurality of image sensors, each of which is divided into two or more detection blocks.

While the preferred embodiments have been described in detail, modifications and variations which will be obvious to those skilled in the art are possible without departing from the spirit of the invention. The scope is therefore to be determined solely by the appended claims.

What is claimed is:

1. A focus condition detecting device comprising:
   an objective lens for forming an image of an object;
   light intensity distribution detecting means for detecting individual light intensity distributions with respect to a plurality of areas defined on a predetermined portion of the image formed by the objective lens to produce a plurality of light intensity distribution signals;
   weighted center position detecting means for detecting a weighted center of the light intensity distribution of said image in accordance with the plurality of light intensity distribution signals;
   determining means for determining one area of the plurality of areas on which the detected position of the weighted center position is formed to be located, and
   focus condition calculating means for calculating a focus condition of the objective lens based on the detected light intensity distribution and information with respect to the area determined by said determining means, said focus condition calculating means outputting the calculated focus condition as a resultant focus condition of the objective lens.

2. A focus condition detecting device comprising:
   an objective lens for forming an image of an object;
   light intensity distribution detecting means for detecting individual light intensity distributions with respect to a plurality of areas defined on a predetermined portion of the image formed by the objective lens;
   contrast calculating means for calculating individual contrasts with respect to said plurality of areas based on the detected light intensity distribution;
   focus condition calculating means for calculating individual focus conditions with respect to said plurality of areas based on the detected light intensity distributions to produce a plurality of focus condition signals, each of said focus condition signals including an amount and a direction of defocus of the objective lens, and
   output means for outputting one of the plurality of the focus condition signals selected in accordance with the plurality of the focus condition signals and the plurality of the detected contrasts, as a resultant focus condition signal of the objective lens.

3. A focus condition detection device comprising:
   an objective lens for forming an image of an object;
   light intensity distribution detecting means for detecting individual light intensity distributions with respect to plural areas defined on a predetermined portion of the image formed by the objective lens;
   focus condition calculating means for calculating individual focus conditions with respect to said plural areas based on the detected light intensity distributions to produce a plurality of focus signals, each of said focus condition signals including an amount and a direction of defocus of the objective lens;

characteristic calculating means for calculating characteristic amounts other than the focus conditions to be calculated by the focus condition calculating means in accordance with the detected light intensity distributions to produce a plurality of characteristic signals; and output means for outputting one of the plurality of the focus condition signals selected in accordance with the plurality of the focus condition signals and the plurality of the characteristic signals, as a resultant focus condition signal of the objective lens.

4. A focus detecting device comprising:

an objective lens for forming an image of an object;

light intensity distribution detecting means for detecting individual light intensity distributions with respect to a plurality of areas defined on a predetermined portion of the image formed by the objective lens to produce a plurality of light intensity distribution signals;

characteristic position detecting means for detecting one characteristic position of a whole image formed by the objective lens in accordance with all of the light intensity distribution signals;

determining means for determining one area, among the plurality of areas, on which the characteristic position is found to be located, and focus condition calculating means for calculating a focus condition of the objective lens based on the plurality of light intensity distribution signals and the determined area.

5. A focus detecting device comprising:

an objective lens for forming an image of an object;

light intensity distribution detecting means for detecting individual light intensity distributions with respect to a plurality of areas defined on a predetermined portion of the image formed by the objective lens to produce a plurality of light intensity distribution signals;

contrast calculating means for calculating individual contrasts with respect to the plurality of areas based on the plurality of light intensity distribution signals;

selecting means for selecting at least one area among said plurality of areas wherein the calculated contrast is higher than the other calculated contrasts;

focus condition calculating means for calculating a focus condition of the objective lens based on the plurality of light intensity distribution signals and the selected area;

discriminating means for discriminating whether or not a reliablity of the selected area is sufficient, and outputting means for outputting the focus condition calculated by the focus condition calculating means when the discriminating means discriminates that the reliability of the selected area is sufficient.

6. A focus detecting device as claimed in claim 5, wherein the focus condition calculating means includes means for calculating a focus condition of the objective lens based on the other area which is not selected by the selecting means.

7. A focus device as claimed in claim 6, further comprising judging means for judging whether or not a reliability of the other area is sufficient, means for generating the focus condition calculated based on the other area when the judging means judges that the reliability of the other area is sufficient, and means for producing an impossible signal representative of impossible focus detection when the judging means judges that the reliability of the other area is not sufficient.

8. A focus detecting device comprising:

an objective lens for forming an image of an object;

light intensity distribution detecting means for detecting individual light intensity distributions with respect to a plurality of areas defined on a predetermined portion of the image formed by the objective lens to produce a plurality of light intensity distribution signals;

contrast calculating means for calculating individual contrasts with respect to the plurality of areas based on the plurality of light intensity distribution signals;

selecting means for selecting at least two areas among said plurality of areas;

focus condition calculating means for calculating a plurality of focus conditions of the objective lens with respect to at least two areas selected, and outputting means for outputting one focus condition based on the plurality of focus conditions calculated by the focus condition calculating means.

9. A focus detecting device as claimed in claim 8, wherein said focus condition calculating means includes means for calculating a plurality of focus conditions each representing an amount of defocus and a direction thereof.

* * * * *